United States Patent
Zhao et al.

(10) Patent No.: US 9,876,887 B2
(45) Date of Patent: *Jan. 23, 2018

(54) METHOD AND APPARATUS FOR MEDIA PROPERTY OR CHARACTERISTIC CONTROL IN A MEDIA SYSTEM

(71) Applicant: GOOGLE TECHNOLOGY HOLDINGS LLC, Mountain View, CA (US)

(72) Inventors: Liang Zhao, Beijing (CN); Yu-Ling Fu, Beijing (CN); Qiu-Ling Li, Beijing (CN)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,732

(22) Filed: May 15, 2017

(65) Prior Publication Data

US 2017/0251091 A1    Aug. 31, 2017

Related U.S. Application Data

(63) Continuation of application No. 14/232,635, filed as application No. PCT/CN2011/078354 on Aug. 12, 2011, now Pat. No. 9,686,396.

(51) Int. Cl.
  *H04M 1/60*   (2006.01)
  *H04M 1/725*  (2006.01)
  (Continued)

(52) U.S. Cl.
  CPC ....... *H04M 1/6066* (2013.01); *H04M 1/7253* (2013.01); *H04N 21/4122* (2013.01);
  (Continued)

(58) Field of Classification Search
  CPC combination set(s) only.
  See application file for complete search history.

(56) References Cited

U.S. PATENT DOCUMENTS

| | | |
|---|---|---|
| 5,987,106 A | 11/1999 | Kitamura |
| 6,021,440 A | 2/2000 | Post et al. |
| | (Continued) | |

FOREIGN PATENT DOCUMENTS

| | | |
|---|---|---|
| CN | 2468236 | 12/2001 |
| CN | 2468236 Y | 12/2001 |
| | (Continued) | |

OTHER PUBLICATIONS

"Advisory Action", U.S. Appl. No. 14/232,635, dated Nov. 2, 2016, 4 pages.

(Continued)

*Primary Examiner* — Qun Shen
(74) *Attorney, Agent, or Firm* — Colby Nipper

(57) ABSTRACT

A method including: transmitting, by a control device, a first portion of content comprising a first portion of a signal corresponding to a multimedia presentation characteristic of a peripheral device; receiving, when an adjustment of the signal is below an adjustment threshold, a first instance of an input indicating a request to change the multimedia presentation characteristic; in response to receiving the first instance of the input, adjusting a second portion of the signal and transmitting a second portion of the content comprising the adjusted second portion of the signal; receiving, when the adjustment of the signal is at or above the adjustment threshold, a second instance of the input; and transmitting, in response to receiving the second instance of the input, a communication signal to the peripheral device to adjust a peripheral device control of an output of the multimedia presentation characteristic.

20 Claims, 6 Drawing Sheets

(51) Int. Cl.
*H04N 21/41* (2011.01)
*H04N 21/422* (2011.01)
*H04N 21/485* (2011.01)
*H04N 21/81* (2011.01)

(52) U.S. Cl.
CPC ..... *H04N 21/4222* (2013.01); *H04N 21/4852* (2013.01); *H04N 21/8106* (2013.01)

(56) References Cited

U.S. PATENT DOCUMENTS

| | | | |
|---|---|---|---|
| 6,292,210 | B1 | 9/2001 | Gerszberg et al. |
| 9,686,396 | B2 | 6/2017 | Zhao et al. |
| 2003/0008687 | A1 | 1/2003 | Nishimura |
| 2003/0011633 | A1 | 1/2003 | Conley et al. |
| 2004/0137967 | A1* | 7/2004 | Bodley ............... H04M 1/05 455/575.2 |
| 2005/0140574 | A1* | 6/2005 | Tamura ............... G06F 1/1616 345/9 |
| 2006/0176827 | A1* | 8/2006 | Lehew ............... H04L 43/00 370/252 |
| 2007/0006745 | A1* | 1/2007 | Putila ............... A61B 5/0006 101/4 |
| 2007/0232222 | A1 | 10/2007 | DeJong |
| 2008/0090617 | A1* | 4/2008 | Sutardja ............... G06F 1/3203 455/566 |
| 2009/0204730 | A1* | 8/2009 | Mochizuki ............ G06F 9/4446 710/19 |
| 2009/0278828 | A1* | 11/2009 | Fletcher ............... G06F 1/3203 345/207 |
| 2010/0016014 | A1 | 1/2010 | White |
| 2010/0016027 | A1 | 1/2010 | Yasuda et al. |
| 2010/0304731 | A1* | 12/2010 | Bratton ............... H04N 5/232 455/420 |
| 2011/0269465 | A1* | 11/2011 | Xu ............... H04W 36/0033 455/436 |
| 2011/0314394 | A1* | 12/2011 | Kilmer ............... H04L 12/1822 715/755 |
| 2013/0308606 | A1* | 11/2013 | Xu ............... H04W 8/186 370/331 |
| 2014/0162625 | A1 | 6/2014 | Zhao et al. |

FOREIGN PATENT DOCUMENTS

| | | |
|---|---|---|
| CN | 101359900 | 2/2009 |
| CN | 101359900 A | 2/2009 |

OTHER PUBLICATIONS

"Final Office Action", U.S. Appl. No. 14/232,635, dated Aug. 29, 2016, 13 pages.
"International Search Report and Written Opinion", Application No. PCT/US2011/078354, dated Apr. 26, 2012, 14 pages.
"Non-Final Office Action", U.S. Appl. No. 14/232,635, dated Mar. 16, 2016, 13 pages.
"Non-Final Office Action", U.S. Appl. No. 14/232,635, dated Dec. 15, 2016, 15 pages.
"Notice of Allowance", U.S. Appl. No. 14/232,635, dated Mar. 3, 2017, 7 pages.
Sony,"HDMI Control Guide, Operating Instructions", Bravia, Theatre Sync, 2007 Sony Corp., 2007, 12 pages.
Sony, "HDMI Control Guide, Operating Instructions",Bravia, Theatre Sync, 2007 Sony Corporation, 3-100-392-31 (1), http://www.sony.net/, printed in Malaysia, all pages.
Patent Cooperation Treaty, International Search Report and Written Opinion of the International Searching Authority for International Application No. PCT/US2011/078354, dated Apr. 26, 2012 14 pages.

* cited by examiner

METHOD AND APPARATUS FOR MEDIA PROPERTY OR CHARACTERISTIC CONTROL IN A MEDIA SYSTEM

CROSS-REFERENCE TO RELATED APPLICATIONS

This Application is a continuation of U.S. patent application Ser. No. 14/232,635, filed 14 Jan. 2017, which is the National Stage of International Application No. PCT/CN2011/078354, filed 12 Aug. 2011, the contents of which are incorporated by reference in their entireties.

BACKGROUND

Technical Field

This invention relates generally to electronic devices, and more particularly to control devices for electronic systems.

Background Art

Portable electronic devices are becoming more and more sophisticated. Using mobile telephones as an example, until recently, these devices were only capable of making telephone calls. Advances in technology have turned the once humble mobile telephone into a complex electronic device capable of performing a variety of tasks. Modern "smart phones" can conduct email correspondence, play games, play music and movies, maintain calendars and contact lists, and so forth.

Some electronic devices are even capable of communicating with other devices to form an electronic system. For example, the advent of Bluetooth technology allows users to wirelessly couple earpieces and headsets to a mobile phone to conduct "hands free" calls. As the systems become more complex, controlling the various functions of the system becomes more complex as well. It would be advantageous to have a portable electronic device that streamlines the control operation to make use of the system simpler and more intuitive.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
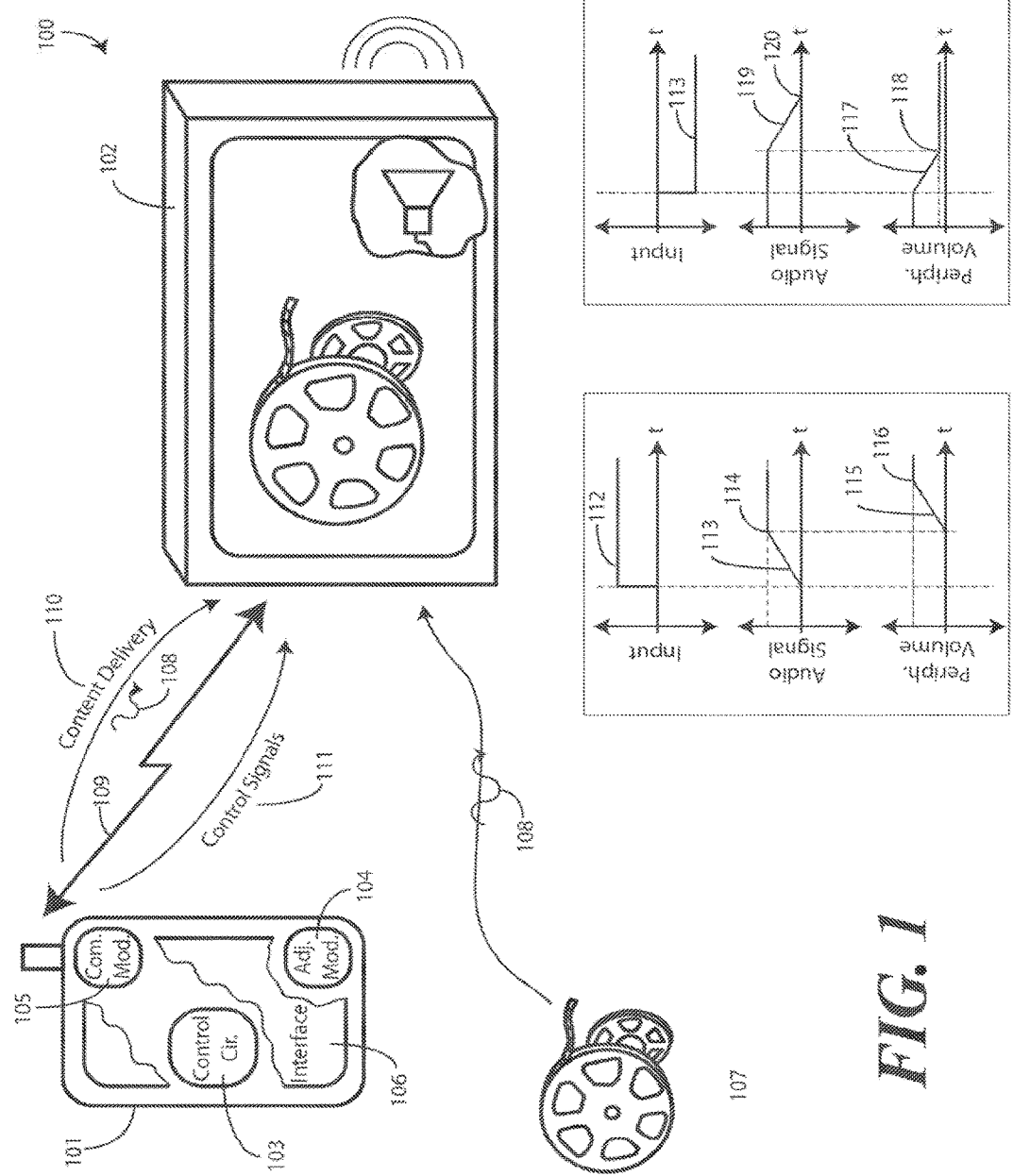
FIG. 1 illustrates an electronic system configured in accordance with one or more embodiments of the invention and including a control device and a peripheral device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to controlling system audio levels by adjusting multimedia properties in response to a single input from a user, such as adjusting both signal levels and local media property controls in response to a single input from the user. Examples of multimedia properties include volume, brightness, hue, brightness, color, tint, bass, or treble levels. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of controlling system property levels by seamlessly transitioning from adjustment of signal levels, e.g., audio signal levels, to adjustment of hardware levels, e.g., output levels of hardware devices, as described herein. The non-processor circuits may include, but are not limited to, a radio receiver, a radio transmitter, signal drivers, clock circuits, power source circuits, and user input devices. As such, these functions may be interpreted as steps of a method to perform a bifurcated, seamless, signal level/hardware level audio or other characteristic control as described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide seamless, simple methods and systems for controlling system level multimedia adjustment controls by transitioning between signal level control and peripheral device hardware control. The multimedia adjustment controls can correspond to audio or video. One multimedia adjustment control is a video adjustment control. Another multimedia adjustment control is an audio adjustment control. Examples of multimedia adjustment controls used to alter multimedia properties include audio level or volume, color level, tint, hue, brightness, contrast, sharpness, bass audio, treble audio, balance, fade, and so forth. Using audio level or volume as an illustrative example, simple methods and systems for controlling system level audio by transitioning between local audio signal level control and peripheral device hardware component control in response to a single user input are provided. With embodiments of the invention, a control device can control a characteristic corresponding to audio or multimedia, such as system audio level by adjusting both the signal level being delivered to a peripheral device and a volume control of the peripheral itself. As an illustration, in one embodiment a volume up command first increases the volume of the content being delivered from the control device to the peripheral. When this adjustment reaches a maximum, the control device increases the volume of the peripheral until it reaches it maximum. In one embodiment the volume down control is done in a similar fashion, and is in effect the reverse of the volume up control.

Illustrating further by example, when a portable electronic device, such as a mobile telephone, smart phone, or other device, is streaming content such as music or video to a peripheral device, such as audio monitors, speakers, a television, or computer, a user can adjust a characteristic associated with the content with a single input. If the characteristic is volume, the overall system level of audio volume can be adjusted without having to separately control individual system components. In prior art systems, a user may have to adjust two, three, or more controls to accomplish the same task. This is not only cumbersome and complex, but is also time consuming by using embodiments of the present invention, the user may adjust multiple volume components or other characteristics with a single control input.

Consider a simple use case. A user has a portable music player that is streaming media to a pair of speakers. When the user wants the volume to go up, there can be multiple ways to achieve increased volume. The user can adjust the signal level being delivered from the portable music player, thereby delivering an amplified signal to the speakers. However, hardware gain limitations may result in this adjustment providing an unsatisfactory amount of volume increase. The user may then have to traverse the room to the speakers to adjust the volume knob on the speakers. As this adjustment is also limited, there may still be an unsatisfactory volume increase. The user may then have to adjust the levels in an intermediate amplifier. The adjustment of these three components is time consuming and complex because it requires the user to interface individually with each component of the system. The user has to first adjust the signal level on the media player, then adjust the speakers, then adjust the amplifier, and so forth. Even where each device is remotely controlled, the user must continually switch remote control units to accomplish the task. Even if a "universal" remote control device is used, the user is still required to manipulate multiple buttons at different times, which time consuming and confusing.

Embodiments of the present invention streamline and simplify this process by providing a single control unit capable of seamlessly adjusting each component of the system serially in response to a single input. For example, in the system from the preceding paragraph, the user may simply request an increased volume with the portable music player. In accordance with the methods described below, the portable music player may first adjust the signal level of the content being delivered to the speakers. When this adjustment reaches a threshold, such as a maximum signal level output, while the user is still requesting increased volume, the portable music player may send an electronic message to the loudspeakers that causes the volume control of the hardware in the loudspeakers to be increased as well. When this adjustment reaches a second threshold, such as maximum audio output from the loudspeakers, while the user is still requesting volume, the portable music player may send a message to another system component requesting yet another volume increase. This can continue until each system component hits a threshold. To the user, a single volume request is made. From the portable music player, a series of incremental increases of singular components, with transitions depending upon thresholds being reached, results in an overall system volume increase. The user simply knows that system volume increased, without worrying about which device was adjusted or by how much each device was adjusted. Volume decrease requests can be accommodated by a similar, but opposite, method.

Similarly, if the user has a portable movie player that is streaming multimedia content to a computer, and the user wants to adjust the contrast of the movie, the user makes a single request through the user interface of a control device to adjust the contrast of the movie. The portable movie player may first adjust the contrast at the signal level of the content being delivered to the computer. When this adjustment reaches a threshold, such as a maximum contrast adjustment at the signal level, if the user's request has still not been fulfilled, the portable movie player may send an electronic message to the computer that causes the hardware contrast adjustment control of the monitor to be adjusted as well. When this adjustment reaches a second threshold, such as maximum monitor contrast adjustment, and the user's request is not completely fulfilled, the portable movie player may send a message to another system component requesting yet another contrast increase. For example, a video mixer may be operable between the control device and the computer. Accordingly, the control device may send a message to the video mixer to adjust its contrast as well. This can continue until each system component hits a threshold. To the user, a single contrast request is made. From the portable movie player, a series of incremental increases of singular components, with transitions depending upon thresholds being reached, results in an overall system contrast change that meets the user's request. The user simply knows that system contrast has changed, without worrying about which device was adjusted or by how much each device was adjusted. Other multimedia presentation characteristics that correspond to content presentation, including color level, tint, hue, sharpness, bass audio level, treble audio level, balance, and fade can be accomplished in a similar fashion.

Turning now to FIG. 1, illustrated therein is a system 100 configured for adjustment of a multimedia presentation characteristic corresponding to content presentation. For ease of illustration, adjustment of audio level will be used to illustrate the adjustment of local, signal level characteristics and the hardware characteristics of a peripheral presentation device. However, it will be clear to those of ordinary skill in the art having the benefit of this disclosure that the adjustment of audio need not be limiting. The adjustment of other multimedia presentation characteristics, including any aspect that can be adjusted for video content, audio content, or multimedia content. Example of these aspects include color level, tint, hue, contrast, sharpness, bass audio level, treble audio level, balance, fade, or other factors can be accomplished using steps similar to those described below with respect to adjustment of audio level. It is expected that one of ordinary skill, notwithstanding possibly significant effort and many design choices motivated by, for example, available time, current technology, and economic considerations, when guided by the concepts and principles disclosed below that relate to adjustment of audio level will be readily capable of applying the steps to the adjustment of color level, tint, hue, contrast, sharpness, bass audio level, treble audio level, balance, fade, or other factors with minimal experimentation.

The illustrative system 100 of FIG. 1 is configured for at least delivering audio to a user. The audio may be audio only, as in the case of music. Alternatively, the audio may be a portion of a multimedia presentation, such as the soundtrack that accompanies a movie.

The system 100 includes an electronic device 101 and a peripheral device 102. In the illustrative embodiment of FIG. 1, the electronic device 101 is a mobile telephone and the peripheral device 102 is a television. However, it should be noted that these devices illustrative examples of the electronic device 101 and peripheral device 102, respectively. It will be clear to those of ordinary skill in the art that the electronic device 101 and the peripheral device 102 could be other devices as well. For example, the electronic device 101 could be a portable music player, a multimedia player, a gaming device, a palm-top computer, a tablet device, and so forth. The peripheral device 102 could be a single loudspeaker, a pair of loudspeakers, a surround sound system, a computer, or other device.

The illustrative electronic device 101 of FIG. 1 includes a control circuit 103, an adjustment module 104, a communication module 105, and a user interface 106. As noted above, the "modules" described herein can be configured as executable code stored in a memory that are executable by the control circuit 103 to effect the functions of the module. Alternatively, the modules can be configured in hardware, such as through one or more application specific or logic circuits.

In one embodiment, the control circuit 103 is configured to cause the delivery of content 107 to the peripheral device 102. In one embodiment, the content 107 is stored within the electronic device 101. This would be the case where the electronic device 101 is a smart phone having an integrated music player. The content 107 could be music, which is streamed from the electronic device 101 to the peripheral device 102 via electronic communication. In another embodiment, the content 107 is stored in a device outside the electronic device 101, such as in a peripheral memory device or server. In the latter embodiment, the control circuit 103 is configured to make content delivery from the peripheral memory device or server commence and cease based upon input received at the user interface 106.

In one embodiment, the content 107 has associated therewith an audio signal 108. In one embodiment, the content 107 can comprise only the audio signal 108, as would be the case when the content is music. In another embodiment, the content 107 can comprise video, still images, or other data that is associated with the audio signal 108, as would be the case when the content is video, a slide show, or a multimedia presentation.

The adjustment module 104 is configured to adjust the audio signal 108 in response to user input. For example, in one embodiment amplifiers and other signal processing hardware in the electronic device 101 can alter the audio signal 108 between zero and a maximum threshold. The maximum threshold is sometimes defined as the maximum amplification of the audio signal 108 that can occur without clipping, noise, or other effects that distort or compromise reproduction of the audio signal 108 on peripheral devices.

The communication module 105 is configured to establish electronic communication with the peripheral device 102. In one embodiment, the electronic communication occurs via a conventional connection, such as by a wire or wired bus that connects the electronic device 101 with the peripheral device 102. In another embodiment, the electronic communication occurs via a wireless connection, such as a near field or local area connection. Examples of such connections include Bluetooth connection, infrared and optical communications, or IP communications, such as electronic communication from the electronic device 101 through a local router or network to the peripheral device 102.

The user interface 106 is configured for receiving user interface. It will be clear to those of ordinary skill in the art that the user interface 106 can take a variety of forms. In one embodiment, the user interface 106 comprises a touch-sensitive interface, such as a touch screen. In another embodiment, the user interface 106 comprises a keypad and display. In some embodiments, the user interface 106 includes navigation devices such as scroll wheels, joysticks, slider bars, toggle switches, and so forth. Of course, combinations of these approaches can be used. A user may employ the user interface 106 to request increases or decreases in the audio volume level of the system 100 in one or more embodiments.

In one embodiment, the initial steps of "playing" content require the communication module 105 of the electronic device 101 to establish communication 109 with the peripheral device 102. Once communication 109 is established, the electronic device 101 either delivers the content 107 directly to the peripheral device 102 via the communication module 105. The content 107 may be stored locally in a memory of the electronic device 101, or may be stored remotely and transmitted through the communication module 105. In another embodiment, the initial steps require only that the electronic device 101 initiate delivery of the content 107 to the peripheral device 102, with communication 109 between the electronic device 101 and the peripheral device being established later in time.

When established, the communication 109 can include both content delivery 110 and control signals 111. The content delivery 110 component occurs when the electronic device 101 is delivering locally stored content 107 to the peripheral device. The control signals 111 component includes signals capable of controlling hardware and software devices of the peripheral device 102. For example, the control signals 111 can include instructions for hardware components, such as volume controls of audio outputs, amplifier controls, or other controls, to increase or decrease, thereby increasing or decreasing the level of audio volume output from the peripheral device.

When a user wishes to increase or decrease the audio volume level of the system 100, the user makes the request through the user interface 106. A volume increase request 112 is a request so increase system level volume, while a volume decrease request 113 is a request to decrease system level volume. The amount of increase or decrease, in one embodiment, depends upon the duration of the request across time. Said differently, the longer the user holds the "volume up" control, the more they want the volume to increase, and vice versa.

In response to receiving the volume adjustment input, the control circuit 103 is configured to take a first volume adjustment action. In one embodiment, the first volume adjustment action comprises causing the adjustment module 104 to adjust the audio signal 108. This can occur by amplifying the audio signal or by encoding level indicia in the digital data comprising the audio signal 108.

In another embodiment, the first volume adjustment action comprises causing the communication module 105 to deliver a control signal 111 comprising a volume adjustment control signal that causes volume controls of the peripheral device to increase. For example, the electronic device 101 may send a "volume up" instruction that causes a volume level of an audio output device, such as a loud speaker, to increase.

In one embodiment, the control circuit 103 decides which of the two actions will be the first volume adjustment action by default. A manufacturer may determine that it is most efficient to first adjust the audio signal 108 level and then adjust the volume of the peripheral device. The manufacturer may program audio signal adjustment as the default first volume adjustment action.

In another embodiment, the choice may be user selectable. For instance, it is often the case that the dynamic range of signal level control is smaller than the dynamic range of audio device control. Consequently, a classical music listener may prefer fine volume control initially, and thus may prefer that the audio signal 108 be altered before the output of the peripheral device 102. Conversely, a heavy metal listener may want to adjust volume more quickly, and thus may prefer the opposite. To accommodate user preferences, the choice of "which" adjustment to make as the initial volume adjustment action.

The control circuit 103 continues the first volume adjustment action until the user input stops, or until a threshold is reached. In one embodiment, the threshold will be the maximum output level achievable without distortion of the content 107 or audio signal 108. When the threshold is reached, and the user input is still being received or is still not satisfied, the control circuit 103 will take a second volume adjustment action that is different from the first. Where the first volume adjustment action was adjusting the level of the audio signal 108, the second volume adjustment action will be sending a control signal 111 to the peripheral device 102 to increase the volume, and vice versa. This second volume adjustment can continue until either the user input ceases, or a second threshold—such as a second maximum volume limit—is reached. Where three, four, or more components are in the system, the process can continue with each device, with the transition between devices occurring at thresholds as described above.

To illustrate by example, presume that the first volume adjustment action comprises the adjustment module 104 adjusting the audio signal 108. When a user makes a volume increase request 112, the adjustment module 104 begins adjusting 113 the level of the audio signal 108. Since the user input is still present, the adjustment module 104 continues to increase the level of the audio signal 108 until a threshold 114 is reached. In this illustration, the threshold 114 is a maximum audio signal level without clipping. Upon reaching the threshold 114, the control circuit 103 sends control signals 111 having volume adjustment control signals to the peripheral device 102 to cause emitted volume levels to increase 115. This can occur until the user input stops, or a second threshold 116 is reached. The second threshold in this illustration is maximum peripheral device volume output level.

When a user makes a volume decrease request 113, the opposite steps can occur. In this illustration the volume decrease request 113 results in the control circuit 103 first sending control signals 111 having volume adjustment control signals to the peripheral device 102 to cause emitted volume levels to decrease 117. This can occur until the user input stops, or a first threshold 118 is reached. The first threshold in this illustration is minimum, non-zero, peripheral device volume output. Upon reaching the threshold, the control circuit 103 can then cause the adjustment module 104 to decrease 119 the audio signal 108 until either the user input stops or a second threshold 120 is reached. In this illustration, the second threshold 120 is a zero audio signal level.

In this illustration, the first increasing volume adjustment action adjusted the audio signal level, while the second increasing volume adjustment action adjusted the output of the peripheral device 102. The first decreasing volume adjustment action adjusted the output of the peripheral device, while the second decreasing volume adjustment action adjusted the audio signal level. It will be clear to those of ordinary skill in the art that this schema is illustrative only, and that any combination of signal level and peripheral device adjustment could be used. Further, the thresholds described above are illustrative only. Thresholds could be user defined, device delineated, and so forth.

Figure 2:
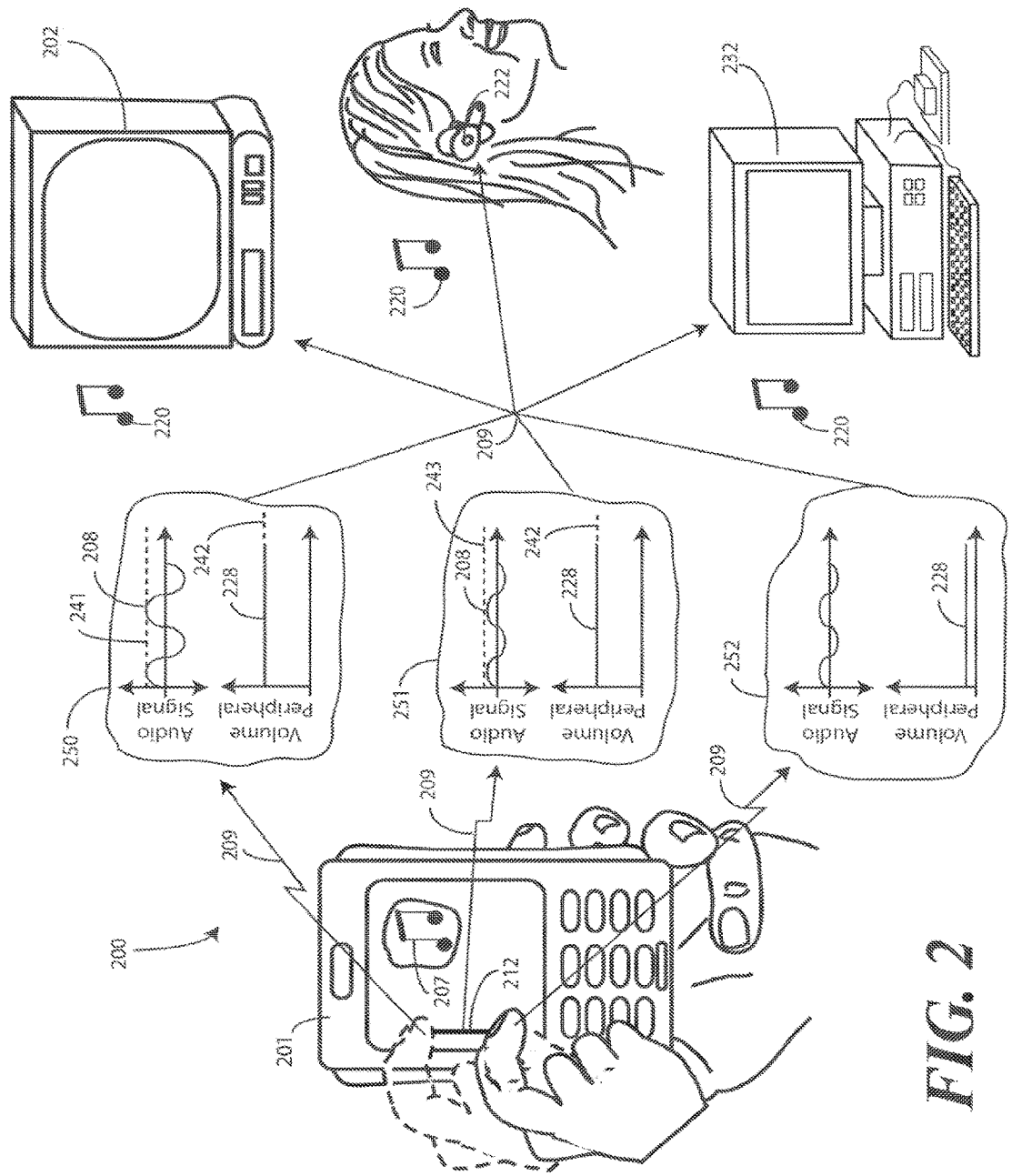
FIG. 2 illustrates another electronic system configured in accordance with one or more embodiments of the invention, and also illustrates one method of controlling a peripheral device of the system in accordance with one or more embodiments of the invention.

Turning now to FIG. 2, illustrated therein is a system 200 for delivering audio output 220 to a user via a peripheral device 202,222,232. As noted above, the peripheral devices can take many forms. For illustration, three types of peripheral devices are shown in FIG. 2. Peripheral device 202 is a television. Peripheral device 222 is an audio headset, while peripheral device 232 is a computer.

A mobile device 201, shown illustratively in FIG. 2 as a mobile telephone, is capable of communication 209 with the peripheral device 202,222,232. The mobile device 201 can be in communication with a single peripheral device, e.g., peripheral device 222, or with multiple peripheral devices 202,222,232. As noted above, the communication 209 can be wired in one embodiment, or wireless in another embodiment.

The mobile device 201 is capable of communication 209, in one embodiment, to playback content 207 on the peripheral device 202,222,232. The content 207 has an associated audio signal, as described above.

When the mobile device 201 receives an input 212 to adjust a volume level of the system 200, the mobile device 201 is configured to initially adjust either the audio signal or the output volume level of the peripheral device 202,222, 232 until a system volume threshold is reached. Where the input 212 remains present and the threshold is reached, the mobile device 201 then adjusts the other of the audio signal or the output volume level of the peripheral device 202,222, 232 until the appropriate volume level is reached.

Illustrating this process graphically, at an initial time 250, system volume level is set by an initial level 241 of the audio signal 208 and an initial level 242 of the output volume level 228 of the peripheral device 202,222,232. At a later time 251, in response to an input request to adjust the volume of the system, the mobile device 201 decreases the audio signal 208 until a system volume threshold 243 is reached. At this later time 251, the output volume level 228 remains at its initial level 242 because the mobile device 201, in this embodiment, is configured to operate on only one volume level adjustment at a time. Upon reaching the system volume threshold 243, at a still later time 252, the mobile device reduces the output volume level 228 of the peripheral device 202,222,232 down as well. As noted above, the choice of which volume control to initially adjust and which volume control to adjust subsequently can be user definable. Specifically, the user may define a user-selected priority as to which should be adjusted first.

Figure 3:
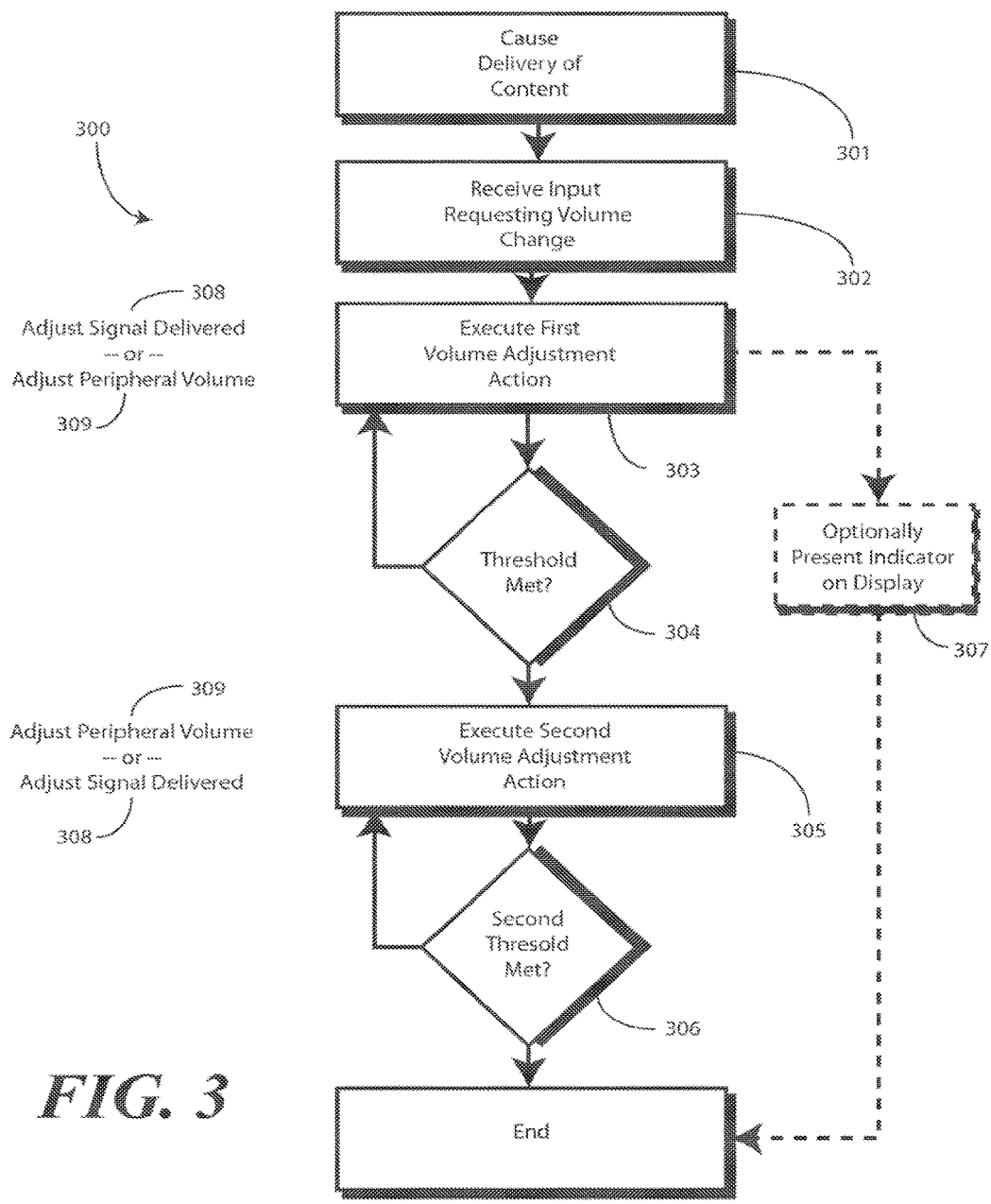
FIG. 3 illustrates one method of controlling an audio output level of a system that includes an electronic device and one or more peripheral devices in accordance with one or more embodiments of the invention.

Turning now to FIG. 3, illustrated therein is a method 300 for controlling audio in a peripheral device. The method 300 is suitable for embodying in executable code stored in a memory device or other non-transient computer readable media. The method 300 can occur where a control device is in communication with a peripheral device.

At step 301, a control device causes the delivery of content to a peripheral device. In one embodiment, the content comprises an audio signal or has an audio signal associated therewith.

At step 302, the control device receives an input requesting a change in audio playback volume from the peripheral device. The input can be received from a user interface, such as a keyboard, slider or rocker control, or voice input. The request to change audio playback volume can be a request to increase audio playback volume or decrease audio playback volume.

At step 303, in response to the input, the control device causes a first volume adjustment. In one embodiment, the first volume adjustment is selected from a plurality of possible volume adjustments of devices within the system. For example, in one embodiment the first volume adjustment is causing adjustment of the audio signal being delivered to the peripheral device 308, such as increasing or decreasing the audio signal. In another embodiment, the first volume adjustment is transmitting a signal to the peripheral device to adjust a volume control of an audio output of the peripheral device 309. Where there is an intermediate device in the system, the first volume control can be transmitting a signal to the intermediate device to adjust its volume.

Provided the first volume adjustment is not adequate to meet the request defined by the input, step 303 will continue until an adjustment threshold is reached. This is determined at decision 304. Upon reaching the adjustment threshold, the control device can cause a second volume adjustment selected from the plurality of possible volume adjustments of devices within the system, and that is different from the first volume adjustment. For example, if the first volume adjustment was causing adjustment of the audio signal being delivered to the peripheral device 308, the second volume adjustment can be transmitting a signal to the peripheral device to adjust a volume control of an audio output of the peripheral device 309. The opposite could be true. Where the first volume adjustment was transmitting a signal to the peripheral device to adjust a volume control of an audio output of the peripheral device 309, the second volume adjustment can be causing adjustment of the audio signal being delivered to the peripheral device 308.

Figure 4:
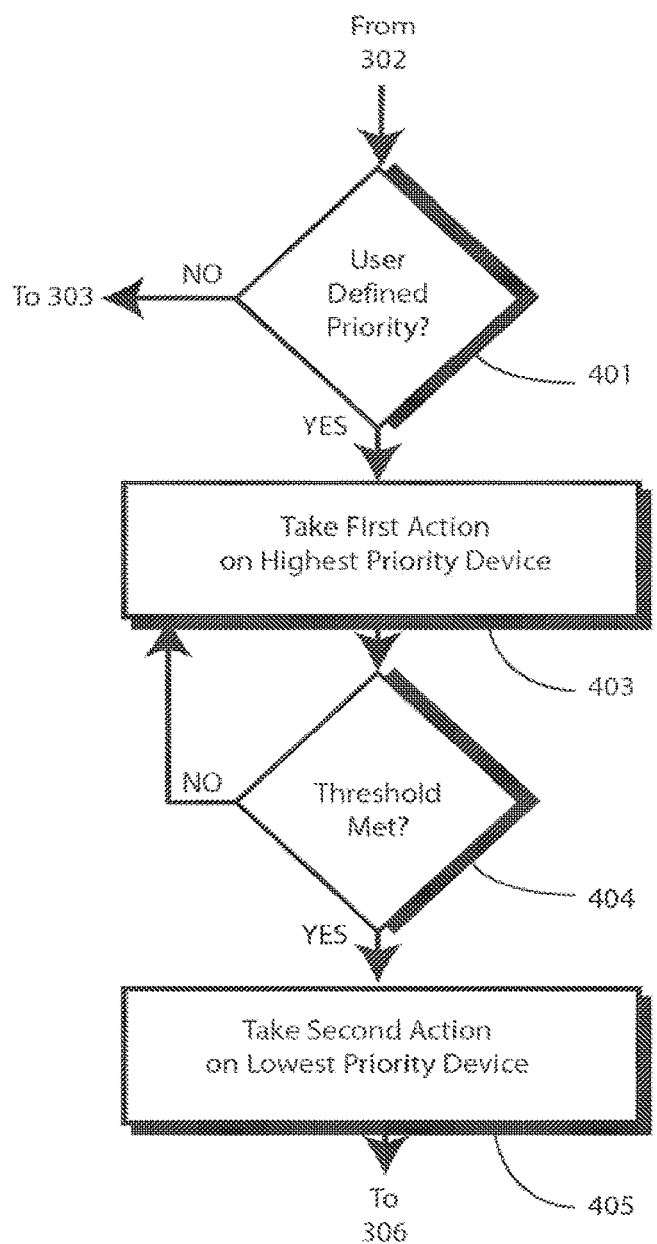
FIG. 4 illustrates optional steps of one method of controlling the audio output level of a system in accordance with one or more embodiments of the invention.

As noted above, the selection of what action to take as the first volume adjustment and what action to take as the second volume adjustment can be user definable. The thresholds for transitioning from the first volume adjustment to the second volume adjustment can be user definable as well. Turning briefly to FIG. 4, illustrated therein is one method 400 showing how the user may define these variables.

In one or more embodiments, the user may define a priority of devices within the system. For example, if the control device delivering content is the higher priority, the signal level being delivered to the peripheral device will be adjusted prior to the volume level of the peripheral device. Conversely, if the peripheral device is defined as having higher priority, its volume will be adjusted before the signal level. These priorities can be defined for both the increasing and decreasing inputs. Also, the thresholds for transitioning can be defined as well. One user may prefer that the threshold associated with decreasing volume for the peripheral device be the lowest, non-zero volume, while others may prefer a predetermined minimum amplification from the peripheral device. Accordingly, they may define the threshold associated with decreasing volume for the peripheral device be set at, say, twenty-five percent of the dynamic range.

Where such a priority scheme is in place, priority is determined at decision 401. When the priority scheme is in place, the first volume adjustment becomes adjusting the level of the first priority device at step 403. The adjustment reaching a threshold, which may be user defined, is determined at decision 404. Adjustment of the next highest priority device can then occur at step 405. Where multiple devices are in the system, the method 400 of FIG. 4 can continue until each element of the system has been adjusted.

Figure 5:
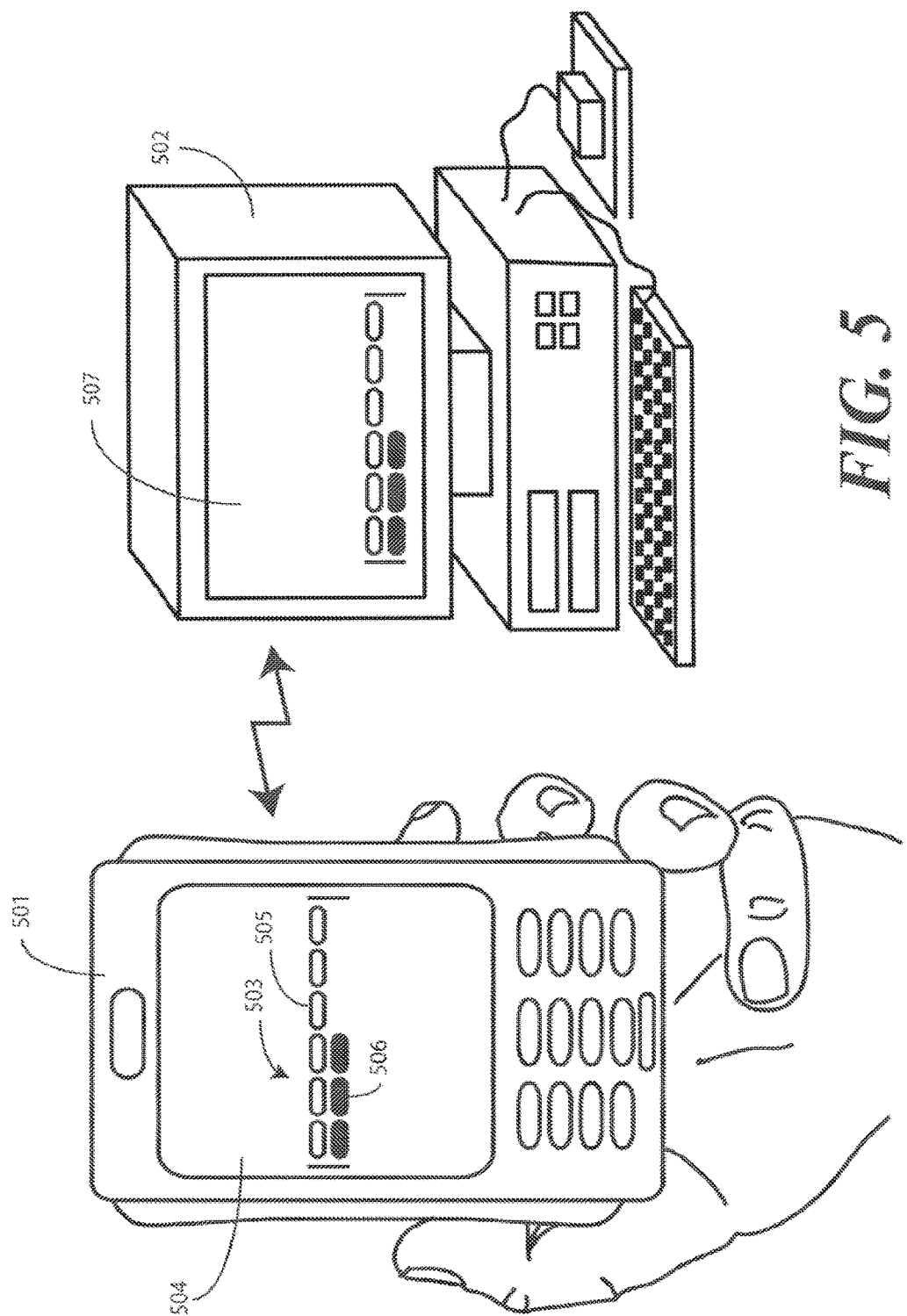
FIG. 5 illustrates one control indicator and a method of presenting the same in accordance with one or more embodiments of the invention.

Turning briefly back to FIG. 3, in one or more embodiments, to provide the user with information indicating how the system volume is being adjusted, an optional control indicator can be presented to the user at step 307. FIG. 5 illustrates one example of indicator presentation. It will be clear to those of ordinary skill in the art having the benefit of this disclosure that numerous other configurations, shapes, colors, and graphical designs of indicators can be created without departing from the spirit and scope of the invention. The embodiment of FIG. 5 is illustrative only.

As shown in FIG. 5, an electronic device 501 configured as a control device comprises a display 504. A control circuit disposed within the electronic device 501 is configured to present a composite indicator 503 on the display 504 indicating system volume level. Here, the illustrative composite indicator 503 indicates a first volume adjustment action level and a second volume adjustment level. Where system volume level is defined by adjustment of an audio signal level being delivered to a peripheral device 502, the composite indicator 503 can be configured as a "dual control indicator." The dual control indicator can have a first control indicator 505 that indicates the first volume adjustment action level, and a second control indicator 506 that indicates the second volume adjustment level. In one or more embodiments, the first control indicator 505 and the second control indicator 506 are configured so as to be visually distinguishable from each other. This can be accomplished by making the first control indicator 505 and the second control indicator 506 different colors, shapes, or sizes.

To illustrate by example, if the first volume adjustment action is adjustment of a signal level from the electronic device 501, and the second volume adjustment action is adjustment of an output volume control of a peripheral device 502, the first control indicator 505 can be configured to indicate the adjustment of the audio signal. The second control indicator 506 can be configured to indicate the adjustment of the volume control. The composite indicator 503 can be presented on a display 504 of the electronic device 501, on a display 507 of the peripheral device 502, or on both.

Figure 6:
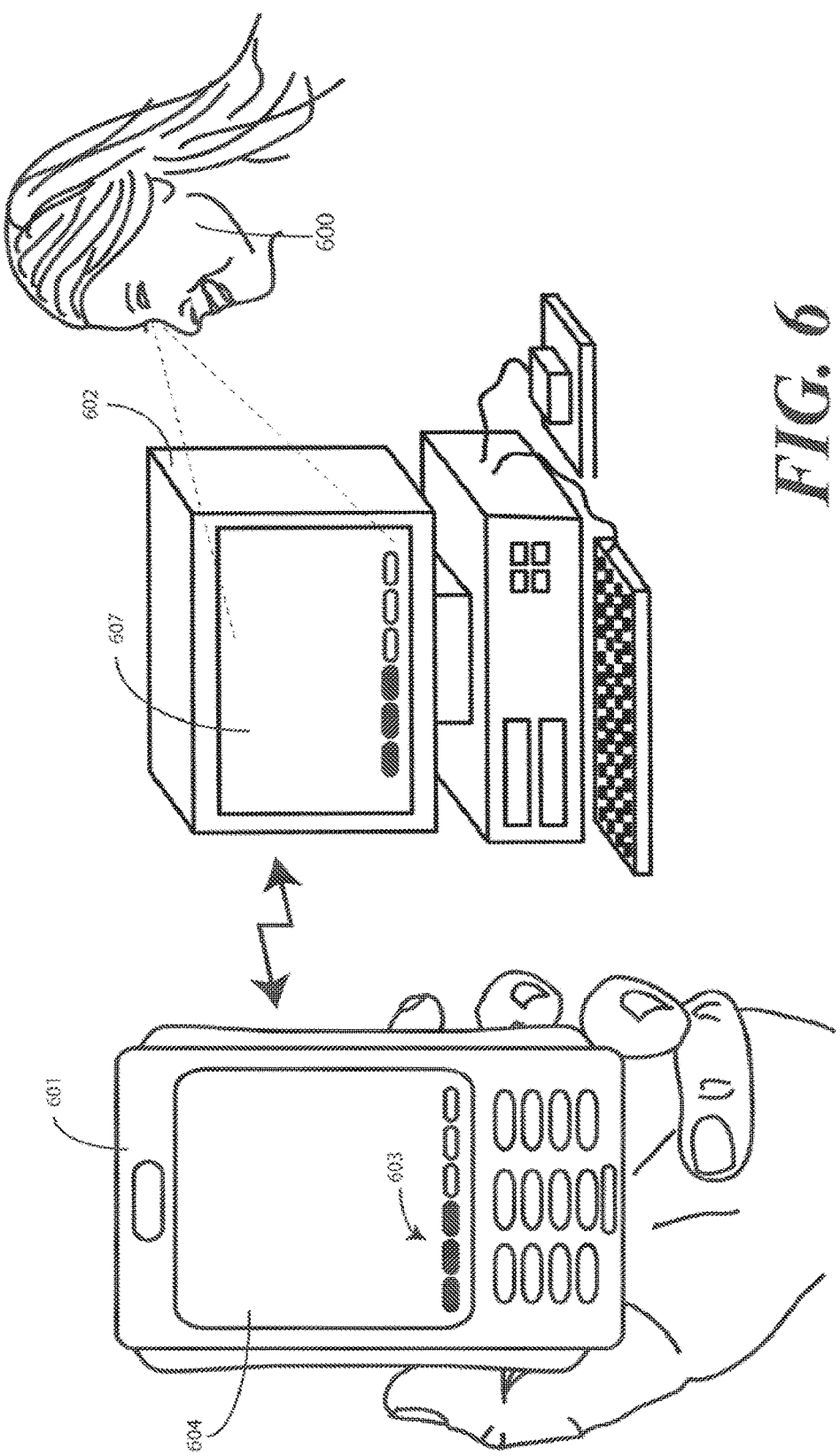
FIG. 6 illustrates another control indicator and method of presenting the same in accordance with one or more embodiments of the invention.

As shown in FIG. 6, an electronic device 601 configured as a control device comprises a display 604. A control circuit disposed within the electronic device 601 is configured to present a composite indicator 603 on the display 604 indicating system volume level. Here, the illustrative composite indicator 603 indicates a combination of the adjustment of the signal corresponding to the multimedia presentation characteristic and the adjustment of the peripheral device control of the output of the multimedia presentation characteristic. Both have been blended into a single composite indicator 603. The single integrated composite indicator 603 provides a seamless, smooth, and continuous experience of tuning one or more multimedia presentation characteristics or properties with a single control device manipulation and one, uniform user interface representation of the composite adjustment. A delighted user 600, who may be completely unaware of whether a signal level in the control device or a hardware component of the peripheral was adjusted, simply knows that the requested adjustment has been accomplished smoothly and continuously. The composite indicator 603 can be presented on a display 604 of the electronic device 601, on a display 607 of the peripheral device 602, or on both.

As described above, embodiments of the invention combine two or more volume controls into a single device that is operational with a peripheral device or a plurality of devices. When a user requests an increase in volume, the control device will adjust the volume of one device until a threshold is reached, and then will adjust the volume of a second device until another threshold is reached. If the user requests a decrease in volume, the opposite will occur. In one or more embodiments, the user can define the order of which device or signal is adjusted initially, and which is adjusted subsequently. The methods described above can be repeated when three, four, or more devices are coupled within a system. System level volume control is thus integrated into a single control on a single device.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, as noted above the control of volume is but one multimedia presentation characteristic that can be controlled with the method steps and apparatus components described above. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method comprising:
    transmitting, by a control device and to a peripheral device external to the control device, a first portion of content comprising a first portion of a signal, the signal corresponding to a multimedia presentation characteristic of the peripheral device;
    receiving, at the control device and when an adjustment of the signal corresponding to the multimedia presentation characteristic is below an adjustment threshold, a first instance of an input indicating a request to change the multimedia presentation characteristic of the peripheral device;
    adjusting, by the control device and in response to receiving the first instance of the input, a second portion of the signal corresponding to the multimedia presentation characteristic, a second portion of the content comprising the second portion of the signal;
    transmitting, by the control device and to the peripheral device, and in response to receiving the first instance of the input, the second portion of the content comprising the adjusted second portion of the signal;
    receiving, at the control device and when the adjustment of the signal corresponding to the multimedia presentation characteristic is at or above the adjustment threshold, a second instance of the input indicating a request to change the multimedia presentation characteristic of the peripheral device; and
    transmitting, by the control device and to the peripheral device, and in response to receiving the second instance of the input, a communication signal to adjust a peripheral device control of an output of the multimedia presentation characteristic of the peripheral device.

2. The method of claim 1, wherein the multimedia presentation characteristic is one of an audio presentation characteristic, a video presentation characteristic, or combinations thereof.

3. The method of claim 2, wherein the multimedia presentation characteristic comprises one of color level, brightness, tint, hue, contrast, sharpness, bass audio level, treble audio level, balance, fade, or combinations thereof.

4. The method of claim 1, wherein
    the multimedia presentation characteristic comprises an audio level,
    the signal corresponding to the multimedia presentation characteristic comprises an audio signal associated with the content, and
    the peripheral device control of the output of the multimedia presentation characteristic of the peripheral device comprises a volume control of an audio output of the peripheral device.

5. The method of claim 4, wherein
    the input indicates a request to increase audio playback volume, and
    the adjusting comprises increasing the second portion of the audio signal.

6. The method of claim 5, wherein the adjustment threshold comprises a maximum audio signal strength.

7. The method of claim 4, wherein
the input indicates a request to decrease audio playback volume, and
the communication signal is configured to decrease the volume control of the peripheral device.

8. The method of claim 4, further comprising causing a dual control indicator to be presented on a display of one or more of the control device or the peripheral device, wherein a first control indicator indicates the adjustment of the audio signal and a second control indicator indicates the adjustment of the volume control.

9. The method of claim 8, wherein the first control indicator and the second control indicator are visibly distinguishable from each other.

10. The method of claim 1, further comprising causing a composite indicator to be presented on a display of one or more of the control device or the peripheral device, the composite indicator indicating a combination of the adjustment of the signal corresponding to the multimedia presentation characteristic and the adjustment of the peripheral device control of the output of the multimedia presentation characteristic.

11. The method of claim 1, wherein the peripheral device is one of an audio headset, an audio playback device, a television, a computer, or a multimedia playback device.

12. An electronic device, comprising:
a control circuit configured to transmit content to a peripheral device external to the electronic device, the content comprising a signal, the signal corresponding to a multimedia presentation characteristic of the peripheral device;
an adjustment module configured to adjust the signal corresponding to the multimedia presentation characteristic;
a communication module configured to transmit a control signal to the peripheral device to adjust a peripheral device control of an output of the multimedia presentation characteristic of the peripheral device; and
an interface configured to receive an input indicating a request to change the output of the multimedia presentation characteristic of the peripheral device;
wherein the control circuit is further configured to:
in response to the interface receiving the input when an adjustment of the signal corresponding to the multimedia presentation characteristic is below an adjustment threshold, cause the adjustment module to adjust, before a portion of the content comprising a portion of the signal corresponding to the multimedia presentation characteristic is transmitted, the portion of the signal; and
in response to the interface receiving the input when an adjustment of the signal corresponding to the multimedia presentation characteristic is at or above the adjustment threshold, cause the communication module to transmit the control signal to the peripheral device.

13. The electronic device of claim 12, wherein
the multimedia presentation characteristic comprises an audio level;
the signal corresponding to the multimedia presentation characteristic comprises an audio signal associated with the content,
the peripheral device control of the output of the multimedia presentation characteristic of the peripheral device comprises a volume control of an audio output of the peripheral device,
the input comprises a request to increase audio playback volume, and
the adjustment threshold comprises a maximum audio signal strength.

14. The electronic device of claim 12, further comprising a display,
wherein the control circuit is further configured to present a composite indicator on the display indicating an adjustment action level of the multimedia presentation characteristic of the peripheral device and an adjustment level of the signal corresponding to the multimedia presentation characteristic by the adjustment module.

15. A method comprising:
transmitting, by a control device and to a peripheral device external to the control device, a first portion of content comprising a first portion of a signal, the signal corresponding to a multimedia presentation characteristic of the peripheral device;
receiving, at the control device and when an adjustment of the signal corresponding to the multimedia presentation characteristic is below an adjustment threshold, a first instance of an input indicating a request to change in the multimedia presentation characteristic of the peripheral device;
transmitting, by the control device and to the peripheral device, and in response to receiving the first instance of the input, a communication signal to adjust a peripheral device control of an output of the multimedia presentation characteristic of the peripheral device;
receiving, at the control device and when the adjustment of the signal corresponding to the multimedia presentation characteristic is at or above the adjustment threshold, a second instance of the input indicating a request to change the multimedia presentation characteristic of the peripheral device;
adjusting, by the control device and in response to receiving the second instance of the input, a second portion of the signal corresponding to the multimedia presentation characteristic, a second portion of the content comprising the second portion of the signal, and
transmitting, by the control device and to the peripheral device, and in response to receiving the second instance of the input, the second portion of the content comprising the adjusted second portion of the signal.

16. The method of claim 15, wherein
the multimedia presentation characteristic comprises an audio level,
the signal corresponding to the multimedia presentation characteristic comprises an audio signal associated with the content, and
the peripheral device control of the output of the multimedia presentation characteristic of the peripheral device comprises a volume control of an audio output of the peripheral device.

17. The method of claim 16, wherein
the input comprises a request to decrease audio playback volume, and
the adjustment threshold comprises a minimum non-zero output volume level of the peripheral device.

18. An electronic device, comprising:
a control circuit configured to transmit content to a peripheral device external to the electronic device, the content comprising a signal, the signal corresponding to a multimedia presentation characteristic of the peripheral device;
an adjustment module configured to adjust the signal corresponding to the multimedia presentation characteristic;

a communication module configured to transmit a control signal to the peripheral device to adjust a peripheral device control of an output of the multimedia presentation characteristic of the peripheral device; and an interface configured to receive an input indicating a request to change the output of the multimedia presentation characteristic of the peripheral device;

wherein the control circuit is further configured to:

in response to the interface receiving the input when an adjustment of the signal corresponding to the multimedia presentation characteristic is below an adjustment threshold, cause the communication module to transmit the control signal to the peripheral device; and in response to the interface receiving the input when an adjustment of the signal corresponding to the multimedia presentation characteristic is at or above the adjustment threshold, cause the adjustment module to adjust, before a portion of the content comprising a portion of the signal corresponding to the multimedia presentation characteristic is transmitted, the portion of the signal.

19. The electronic device of claim 18, wherein the multimedia presentation characteristic comprises an audio level;

the signal corresponding to the multimedia presentation characteristic comprises an audio signal associated with the content, the peripheral device control of the output of the multimedia presentation characteristic of the peripheral device comprises a volume control of an audio output of the peripheral device, the input comprises a request to decrease audio playback volume, and the adjustment threshold comprises a minimum non-zero output volume level of the peripheral device.

20. The electronic device of claim 18, further comprising a display, wherein the control circuit is further configured to present a composite indicator on the display indicating an adjustment action level of the multimedia presentation characteristic of the peripheral device and an adjustment level of the signal corresponding to the multimedia presentation characteristic by the adjustment module.

\* \* \* \* \*